UNITED STATES PATENT OFFICE.

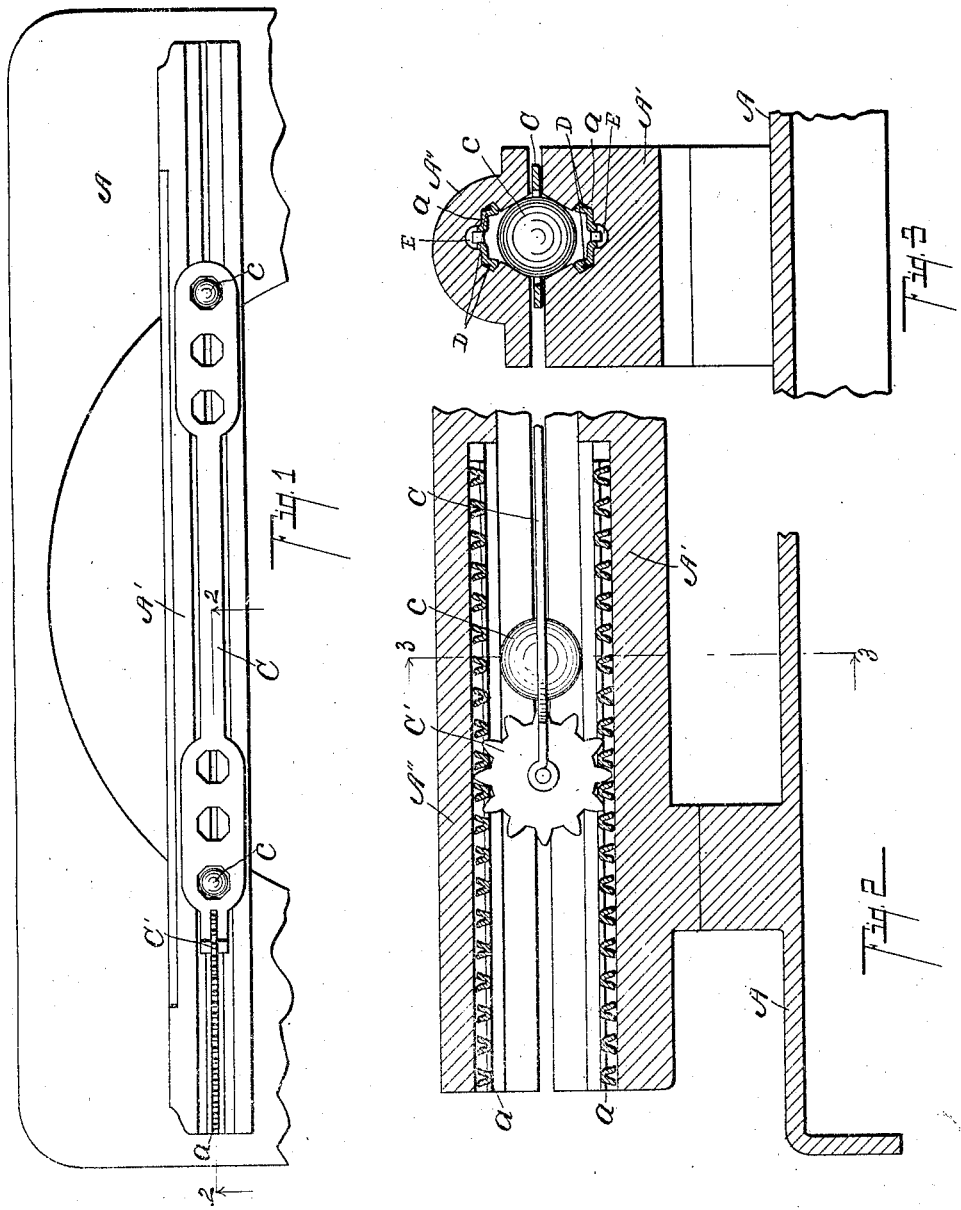

WILLIAM R. FOX, OF GRAND RAPIDS, MICHIGAN.

BALL RETAINING AND LOCATING DEVICE FOR TYPE-WRITERS.

No. 819,270.      Specification of Letters Patent.      Patented May 1, 1906.

Application filed July 28, 1905. Serial No. 271,681.

*To all whom it may concern:*

Be it known that I, WILLIAM R. FOX, a citizen of the United States, residing at the city of Grand Rapids, county of Kent, State of Michigan, have invented certain new and useful Improvements in Ball Retaining and Locating Devices for Type-Writers, of which the following is a specification.

This invention relates to improvements in ball retaining and locating devices for type-writing machines.

The objects of this invention are, first, to provide an improved ball retaining and locating device whereby the balls will be retained in proper position and cannot work out of position toward either end of the carriage when the carriage is reciprocated; second, to provide an improved ball retaining and locating device of simple, durable, and inexpensive construction.

Further objects and objects relating to structural details will definitely appear from the detailed description to follow.

I accomplish the objects of my invention by the devices and means described in the following specification.

The invention is clearly defined and pointed out in the claims.

A structure embodying the features of my invention is fully illustrated in the accompanying drawings, forming a part of this specification, in which—

Figure 1 is a plan view of the rear portion of the top plate of a type-writing machine after the carriage has been removed, showing my improved ball retaining and locating device and rear rail. Fig. 2 is an enlarged longitudinal sectional view of the carriage, its supporting-ball, rear rail, and ball-retainer, taken on a line corresponding to line 2 2 of Fig. 1. Fig. 3 is an enlarged cross-sectional view taken on a line corresponding to line 3 3 of Fig. 2.

In the drawings all of the sectional views are taken looking in the direction of the little arrows at the ends of the section-lines, and similar letters of reference refer to similar parts throughout the several views.

Referring to the lettered parts of the drawings, A represents the rear of the top plate of a type-writing machine, upon which is supported the rear rail A'. In this rail is formed longitudinally and centrally a V-shaped groove or ball-race having inclined or bearing surfaces for the balls $c$ $c$, upon which the carriage A'' is mounted. The sides of this said groove or ball-race below the said bearing-surfaces are recessed to receive the rack $a$, while along the bottom of the said groove or ball-race is a smaller groove E to permit of the passage of the teeth of the pinion C'. The carriage A'' has at its rear a groove or ball-race with recesses D at the sides and smaller groove E, corresponding to the groove or ball-race, recesses D, and smaller groove E of the rear rail A'. The recesses in the carriage ball-race are to receive the rack $a'$, corresponding to the said rack $a$. Between the rail A' and the carriage A'' are the balls $c$ $c$, two in number and of convenient size. These balls are held in position by the retaining-frame C. This retaining-frame is a plate, preferably made from sheet metal, with a perforation at each end to locate and keep the balls a proper distance apart when more than one is used. It is also provided at one end with the pinion C'. The racks $a$ and $a'$, preferably made from sheet metal, are provided longitudinally and centrally with a series of transverse slots or perforations adapted to receive the teeth of the pinion C'.

The racks are somewhat of a U shape and have the edges turned over and down. This turning down of the edges gives the rack increased strength and stiffness and permits it to be inserted or withdrawn from the recesses and to be held in position without screws or other means. While the grooves in the rail A' and in the carriage A'' may be recessed their entire length and several pinions employed, I prefer to recess the grooves only one-half their length and to use but one pinion. This construction is both simple and inexpensive and permits of the utmost freedom in the movement of the carriage. By the employment of the racks $a$ and $a'$ and the pinion C' the balls are prevented from working out of position toward either end of the grooves or ball-race and will always retain the same position relative to the carriage whenever the carriage is brought to rest at the center of the machine.

This device can be made use of for retaining any number of balls in place, one or more; but a pair of balls is usually sufficient for the purposes here indicated. In tabulating-machines, however, it is desirable to use three balls in each end of the retaining-frame or ball-spacer.

Various other changes in details of construction and arrangement may be made without, however, departing from my invention.

Having thus described my invention, what I claim as new, and desire to secure by Letters Patent, is—

1. In a ball retaining and locating device for type-writing carriages, the combination of a rear rail having a V-shaped groove or ball-race suitably recessed; a carriage having a corresponding V-shaped groove or ball-race suitably recessed; balls interposed between said grooves or ball-races and held in position by a ball-retaining frame; U-shaped racks, consisting of sheet-metal strips with the edges turned over and down and provided longitudinally and centrally with transverse slots or perforations, adapted to be received in said recesses in said rear rail and carriage; and a pinion connected to said ball-retaining frame at one end, coacting between said racks, whereby the ball-retainer is kept in position by means independent of the balls themselves, for the purpose specified.

2. In a ball retaining and locating device for type-writing carriages, the combination of a rail having a groove or ball-race suitably recessed; a carriage having a corresponding groove or ball-race suitably recessed; balls interposed between said grooves or ball-races and held in position by a ball-retaining device; U-shaped racks, consisting of sheet-metal strips with the edges turned over and down and provided longitudinally and centrally with transverse slots or perforations, adapted to be received in said recesses in said rail and carriage; and a pinion connected to said ball-retaining device, coacting between said racks, for the purpose specified.

3. In a ball retaining and locating device for type-writing carriages, the combination of a rear rail having a groove or ball-race suitably recessed; a carriage having a corresponding groove or ball-race suitably recessed; balls interposed between said grooves or ball-race; a ball-spacer provided at one end with a pinion coacting between the said racks, whereby the ball-retainer is kept in position by means independent of the balls themselves; racks having turn-down edges and provided longitudinally and centrally with transverse slots or perforations, adapted to be received in said recesses in said rear rail and carriage; for the purpose specified.

4. In a ball retaining and locating device for type-writing carriages, the combination of a carriage with a recessed ball-race therein; a rail provided with a corresponding recessed ball-race; balls interposed between said ball-races and held in position by a ball-retaining device; U-shaped racks consisting of sheet-metal strips and having the edges turned over and down and provided longitudinally and centrally with transverse slots or perforations, adapted to be received in said recessed ball-races; a pinion connected to said ball-retaining device and coacting between said racks; for the purpose specified.

5. In a ball retaining and locating device for type-writing carriages, the combination of a carriage with a recessed ball-race therein; a rail provided with a corresponding recessed ball-race; balls interposed between said ball-races and held in position by a ball-retaining device; racks provided longitudinally and centrally with transverse slots or perforations, adapted to be received in said recessed ball-races; a pinion connected to said ball-retaining device and coacting between said racks, for the purpose specified.

6. In a ball retaining and locating device for type-writer carriages, the combination of the type-writer frame with suitable recessed ball-races; a carriage with a corresponding recessed ball-race; racks having turned-down edges and provided with transverse slots or perforations, adapted to be received in the recesses of said ball-races; ball-bearings between the type-writer frame and the carriage; a perforated plate embracing said ball-bearings and movable therewith; and a pinion connected to said perforated plate, coacting between said racks, for the purpose specified.

7. In a ball retaining and locating device for type-writer carriages, the combination of the type-writer frame with suitable recessed ball-races; a carriage with a corresponding recessed ball-race; racks adapted to be received in the recesses of said ball-races; ball-bearings between the type-writer frame and the carriage; a perforated plate embracing said ball-bearings and movable therewith; and a pinion connected to said perforated plate, coacting between said racks, for the purpose specified.

In witness whereof I have hereunto set my hand and seal in the presence of two witnesses.

WILLIAM R. FOX. [L. S.]

Witnesses:
S. E. LIVINGSTON,
ETTA HELMKA.